United States Patent [19]

DeBetta

[11] 4,299,034
[45] Nov. 10, 1981

[54] LOG SIZER

[75] Inventor: Joseph G. DeBetta, Woodbourne, N.Y.

[73] Assignees: Abbe Cormier, Danbury, Conn.; Sigmund Nokland, Mahopac, N.Y.

[21] Appl. No.: 98,324

[22] Filed: Nov. 29, 1979

[51] Int. Cl.$^3$ ............................................. B27G 23/00
[52] U.S. Cl. ..................................... 33/185 R; 33/161
[58] Field of Search .................... 30/373; 33/202, 161, 33/403, 186, 185 R, 42

[56] References Cited

U.S. PATENT DOCUMENTS

| | | | |
|---|---|---|---|
| 2,765,007 | 10/1956 | Hoffmann | 33/202 X |
| 2,800,933 | 7/1957 | Michael | 30/373 |
| 2,807,292 | 9/1957 | Gelinas | 33/161 |
| 3,043,351 | 7/1962 | Davis | 30/373 |
| 3,531,870 | 10/1970 | Romancky | 33/161 X |

FOREIGN PATENT DOCUMENTS 1383377  11/1964  France .................................. 30/373

Primary Examiner—Harry N. Haroian
Attorney, Agent, or Firm—John Maier, III

[57] ABSTRACT

An attachment for use with a chain saw to determine accurately the length of wood being cut, said attachment including a C-channel attached to the base of the chain saw with a measuring bar slidably mounted in the C-channel and adapted to be secured at any position. Two graduated scales on the bar indicate the distance from the cutting chain to either end of the measuring bar.

3 Claims, 5 Drawing Figures

U.S. Patent  Nov. 10, 1981  4,299,034
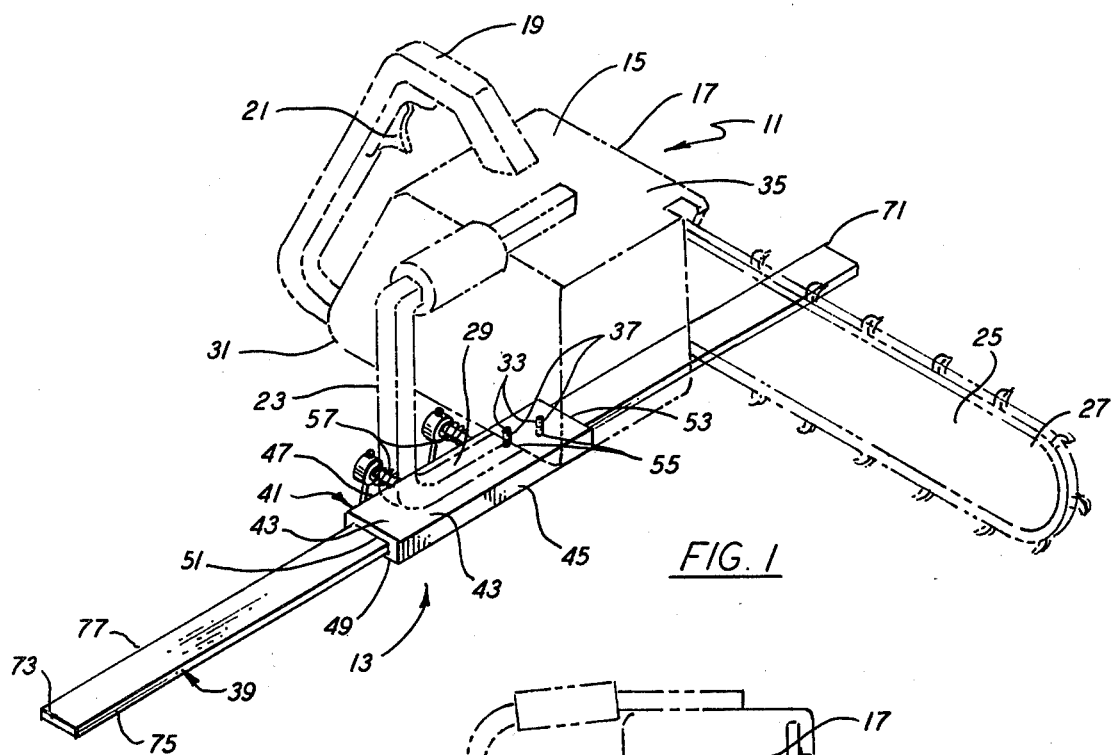
FIG. 1
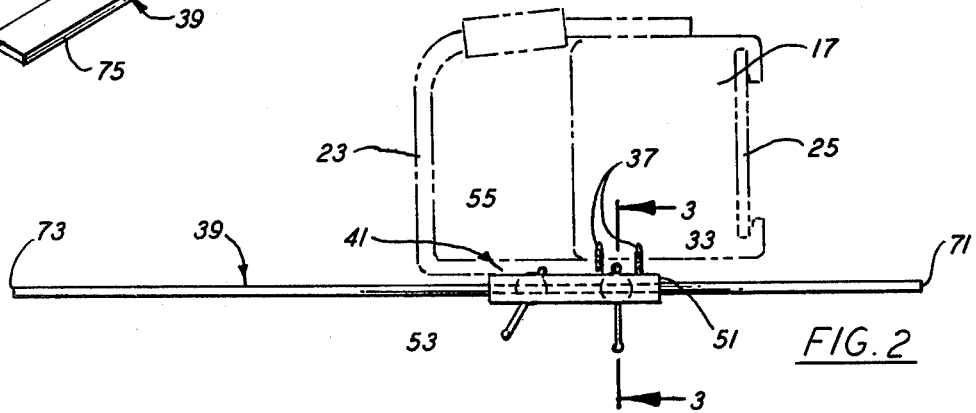
FIG. 2
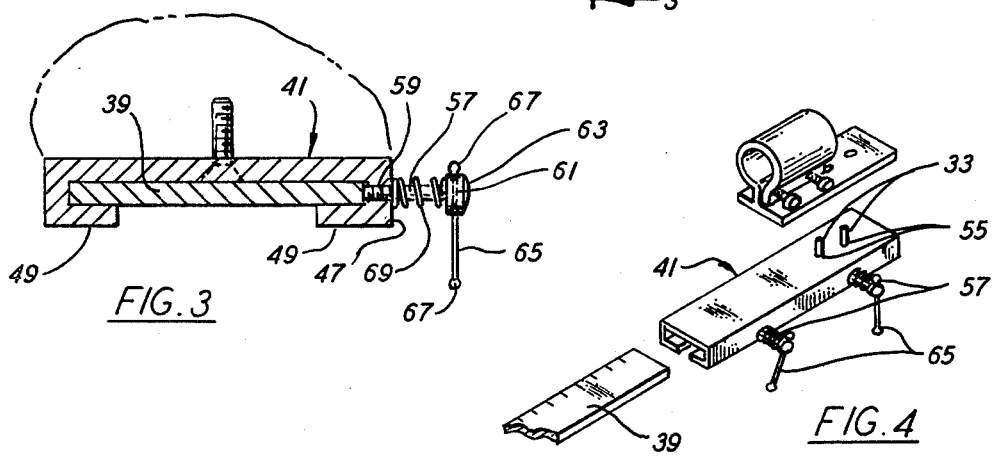
FIG. 3
FIG. 4
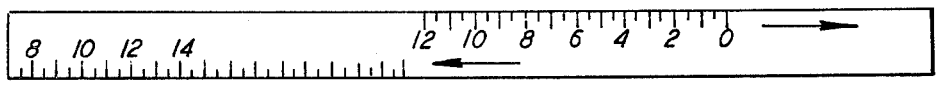
FIG. 5

LOG SIZER

BACKGROUND OF THE INVENTION

This invention relates generally to an attachment to a chain saw for determining the length of wood being cut.

Due to the increasing cost of energy more and more people are resorting to the use of firewood as a source of heat. Stoves and furnaces utilizing firewood as a source of heat vary in size requiring the use of wood of various sizes. Wood for use in cook stoves frequently must be of a size less than 16" inches in length and that used in the larger furnaces and stoves can range up to a length as high as four feet. A great number of the new wood stoves used for home heating, use wood in the two foot range.

It is very dangerous to place a log in a fire and have it begin ignition immediately only to fine that it is just slightly too long to permit closing of the door to the firebox. On the other hand, where the wood used is too short, the amount of fuel being placed in the firebox can be insufficient to supply the heat required. Therefore, it is important when cutting wood to cut it to an adequate predetermined length.

Unfortunately, when cutting cord wood with a chain saw, it is very difficult to judge distance. This results in a wide variety of wood lengths. This, of course, in addition to the problem of the size of the firebox results in difficulty in measuring wood quantities for pricing the wood for sale. For a woodsman to scribe a mark on each log so as to assure the desired length virtually doubles the length of time required to complete the task, making the cost of the wood very expensive.

Also when cutting in the woods, if a device is attached to the saw, it is important that it can be easily and sufficiently removed from the saw to permit the ready use of the saw for felling trees.

The novel features which are considered as characteristics of the invention are set forth with particularity in the appending claims. The invention itself, however, as to its construction of obvious advantages, will best be understood from the following description of the specific embodiment when read with the accompanying drawings.

SUMMARY OF THE INVENTION

This invention provides an attachment to a chain saw for accurately controlling the length of cord wood being cut by a chain saw. The attachment, providing the chain saw is suitable, is attached to the base chain saw by using the screws which secure the side handle to the base of the chain saw. With a chain saw not having screws at the base of the side handle, a clamp is utilized on the side handle itself. A measuring bar is slidably mounted in a C-shaped channel with a graduated measurement on each edge of the bar. One edge indicates the distance from the cutting chain to the end of the bar on the operator's left side and the other on the operator's right side. A pair of spring-loaded bolts are threaded into the edge of the C-channel to press against the measuring bar to lock it at the place desired for the specified wood length and the desired position for cutting, namely to the right or left. The bolts include a pin slidably mounted in the head so as to provide a means for tightening the bolts. The pins have ball ends to retain them in the bolts so they will not be lost in the woods.

By opening the bolts, the measuring bar may be removed so it will not in anyway interfere with use of the saw in other applications such as cutting trees.

DESCRIPTION OF THE DRAWINGS

FIG. 1 is a perspective view showing the chain saw in silhouette with the attachment affixed to the base of the chain saw.

FIG. 2 is a front elevation of a chain saw with the attachment affixed thereto.

FIG. 3 is a cross-sectional view along lines 3—3 of FIG. 2.

FIG. 4 is a perspective view of a alternate embodiment of the invention utilizing a clamp for securing the C-shaped panel to the handle of the chain saw.

FIG. 5 is a plan view of the underside of the measuring bar showing the scale arrangement.

DETAILED DESCRIPTION OF THE INVENTION

The same reference numerals are used throughout the drawing and specification to note a similar item of the invention.

Referring now to FIG. 1, there is shown in silhouette a chain saw 11 with the attachment 13 in place. The chain saw 11 includes an engine 15 with an engine housing 17, a rear handle 19 with a throttle lever 21 and a side handle 23. Extending from the engine housing 17 is a chain bar 25 on which is mounted a cutting chain 27. The cutting chain 27 is drawn about the chain bar 25 by a sprocket (not shown) mounted on the engine 15. Various styles of chain saws 11 are made by different manufacturers, all of which in general fall within the above general description of a chain saw 11.

Many of the chain saws 11 manufactured secure the lower end 29 of the side handle 23 of the chain saw 11 on the base 31 of the engine housing 17 by means of two screws 33 which are threaded into the engine housing 17. The side handle 23 is tubular in form and is usually affixed to the top 35 of the engine housing 17. The lower end 29 of the side handle 23 is fastened by the two screws 33 which engage tapped holes 37 in the base 31 of the engine housing 17.

A measuring bar 39 is slidably mounted within a C-channel 41 which is rigidly secured to the base 31 of the engine housing 17 of the chain saw 11.

The C-shaped channel 41 includes a top surface 43, a forward edge 45 and a rear edge 47 and a pair of protrusions 49 parallel to the top surface 43. The C-shaped channel 41 has a left end 51 and a right end 53. In the top surface 43 two openings 55 are provided which are spaced apart the same distance as the two screws 33 used to mount the lower end 29 of the side handle 23 to the base 31 of the engine housing 17. By removing the two screws 33 and then placing the C-channel 41 over on the base 31 of the engine housing 17 with the two openings 55 aligned with the tapped holes 37 of the engine housing 17, the two screws 33 are reinserted and the C-channel 41 is thereby rigidly mounted to the chain saw 11.

In the rear edge 47 of the C-channel 41, there are two threaded bolt holes 59. A pair of threaded bolts 57 are placed in the threaded bolt holes 59. The pair of threaded bolts 57 have a thread compatible with the threaded bolt holes 59. Each of the threaded bolts 57 have a head 61 with a shaft 63 through it. The shaft 63 is located in a plane substantially at right angles to the threaded shank of the threaded bolts 57. A pin 65 is fitted in each of the shafts 63. Each pin 65 has a ball 67 at each end to prevent the pin 65 from sliding out of the shaft 63. A spring 69 is also provided on each of the bolts 57 to provide tensioning of the bolts 57 when in place thereby inhibiting them from becoming loose due to the vibration of the chain saw 11. The pin 65 is used to tighten and loosen the bolts 57. Each pin 65 may be slid back and forth in the respective shaft 63 so to provide the most advantageous leverage.

The measuring bar 39 has a right end 71 and a left end 73 as well as a forward edge 75 and a rear edge 77 when following the end of the chain bar 25 with the chain saw 11 in its operating position. Separate graduated scales are located on the forward edge 75 and rear edge 77 of the measuring bar 39. The measuring bar 39 is placed in the C-channel 41 with the graduated scales on the lower surface 78 so as to be read by inverting the chain saw 11. When holding the chain saw 11 upside down, an operator, with the handle remote and the chain pointing toward the operator, is able to read the distance from the center of the chain bar 25 and cutting chain 27 to the right end 71 of the measuring bar 39 (at the opertor's left side when upside down) by reading the scale measurement at the edge of the right end 53 of the C-channel 41 on the forward edge 75 of the measuring bar 39. Likewise, the distance from the left end 73 of the measuring bar 39 to the center of the cutting chain 27 would be shown on the rear edge 77 of the measuring bar 39 (at the operator's right side when upside down) by reading the scale measurement at the edge of the left end 51 of the C-channel 41 on the rearward edge 77 of the measuring bar 39. In this way, an operator can utilize the attachment from either side of the chain saw.

The minimum reading on the rear edge 77 of the measuring bar 39 would be the distance from the left end 51 of the C-shaped channel 41 to the chain bar 25. Thus, the minimum reading on the scale on the rear edge 77 is some finite number such as seven inches. As the measuring bar 39 was extended further to the left the measurement so read on rear edge 77 of the measuring bar 39 would increase since the distance from the left end 73 of the measuring bar 39 and the left side of the chain bar 25 and cutting chain 27 would increase. Similarly, when reading the scale on the forward edge 75 from the right end 71 of the measuring bar 39 and the right end 53 of the C-shaped channel, the measuring bar 39 would have to extend the distance from the right end 53 of the C-shaped channel to the chain bar 25 and cutting chain 27 before even a zero reading would appear. This is essential since the right end 71 of the measuring bar 39 must extend beyond the right side of the chain bar 25 to give any measurement. Therefore, on the front edge 75 there is a blank space before the scale even begins. As the measuring bar is further extended to the right passed the chain bar 25, the scale reading on the forward edge 75 would equally increase.

The measuring bar 39 can be readily removed thereby permitting the saw to be used as if no attachment had ever been applied. The measuring bar 39, being long, can be readily stored and is not easily misplaced.

The invention may be embodied in other specific forms without departing from the spirit or essential characteristics thereof. The present embodiments are, therefore, to be considered in all respects as illustrative and not restrictive. The scope of the invention being indicated by the appended claims rather than the foregoing description and all changes which come within the meaning and range of equivalence of the claims are, therefore, intended to be embraced therein.

I claim:

1. An attachment for a chain saw with a cutting chain and having an engine housing with a base, said attachment being used to determine accurately the length of a log being cut, said attachment comprising:
   a C-shaped channel having a top surface, a forward edge, a rear edge and a pair of protrusions parallel to the top surface;
   means for securing rigidly said C-shaped channel to the base of said engine housing;
   a measuring bar with two opposite ends and a forward edge and a rear edge slidably mounted in said C-shaped channel, said measuring bar having a graduated scale on each edge on one surface facing away from the top surface of the C-shaped channel, one graduated scale indicating the distance from one end of the measuring bar to the center of the cutting chain of the chain saw and the other graduated scale indicating the distance from the other end of the measuring bar to the center of the cutting chain of the chain saw; and
   bolt means threaded into said C-shaped channel to secure said measuring bar in a predetermined position in said C-shaped channel.

2. An attachment according to claim 1 wherein:
   said base of said engine housing has two threaded openings;
   said top of said C-shaped channel has two openings in its adapted to align with said two threaded openings in the base of said engine housing; and
   said means for securing rigidly said C-shaped channel to the base of said housing includes a pair of bolts extending through said two openings in the top of said C-shaped channel and engaging said threaded openings in the base of said engine housing.

3. An attachment according to claim 1 wherein said means for securing rigidly said C-shaped channel to the base of said engine housing includes a clamp means adapted to be secured to the handle of the chain saw to hold the C-shaped channel across the base of the engine housing.

* * * * *